US012773722B2

(12) United States Patent
Ukisu et al.

(10) Patent No.: US 12,773,722 B2
(45) Date of Patent: Oct. 27, 2026

(54) ARTICLE SORTING FACILITY

(71) Applicant: Daifuku Co., Ltd., Osaka (JP)

(72) Inventors: Kenichi Ukisu, Tokyo (JP); Masaya Miyamoto, Tokyo (JP); Toru Konagaya, Hinocho (JP); Akira Takeuchi, Hinocho (JP); Masayuki Uchida, Hinocho (JP); Shohei Nogami, Hinocho (JP); Kazuharu Yoshinaga, Hinocho (JP); Daiki Takagi, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/900,197

(22) Filed: Sep. 27, 2024

(65) Prior Publication Data

US 2025/0108407 A1 Apr. 3, 2025

(30) Foreign Application Priority Data

Sep. 29, 2023 (JP) ................................ 2023-169633

(51) Int. Cl.
*B65G 1/04* (2006.01)
*B07C 3/08* (2006.01)

(52) U.S. Cl.
CPC .............. *B07C 3/08* (2013.01); *B65G 1/0492* (2013.01)

(58) Field of Classification Search
CPC ..... B07C 3/08; B07C 3/02; B07C 2501/0063; B07C 5/36; B65G 1/0492; B65G 1/1378
See application file for complete search history.

(56) References Cited

U.S. PATENT DOCUMENTS

| | | | | |
|---|---|---|---|---|
| 7,894,932 B2 * | 2/2011 | Mountz | G06Q 10/087 | 700/214 |
| 7,991,505 B2 * | 8/2011 | Lert, Jr. | B65G 1/0492 | 700/214 |
| 10,906,750 B2 * | 2/2021 | Mori | B65G 1/0492 | |
| 2011/0130869 A1 * | 6/2011 | Linge | B65G 1/1378 | 700/218 |
| 2017/0320102 A1 * | 11/2017 | McVaugh | B65G 1/0492 | |
| 2023/0241647 A1 * | 8/2023 | Mishina | G05D 1/693 | 209/606 |
| 2024/0425283 A1 | 12/2024 | Ogawa et al. | | |

FOREIGN PATENT DOCUMENTS

| | | |
|---|---|---|
| JP | 4350019 A | 12/1992 |
| WO | 2023182369 A1 | 9/2023 |

* cited by examiner

*Primary Examiner* — Lynn E Schwenning
(74) *Attorney, Agent, or Firm* — The Webb Law Firm

(57) ABSTRACT

A floor F1 of an article sorting facility 100 includes a transfer area 1 where transfer work is performed to transfer articles G to transport vehicles V. The transfer area 1 includes a transfer passage R1 extending in a Y direction; and a first transfer section 11 and a second transfer section 12 where transfer work for transfer to the transport vehicles V on the transfer passage R1 is performed. The transfer passage R1 includes a first stop position for the transport vehicles V to be supplied with the articles G by the transfer work in the first transfer section 11 to stop; and a second stop position for the transport vehicles V to be supplied with the articles G by the transfer work in the second transfer section 12 to stop, the first stop position and the second stop position set at different positions on the transfer passage R1.

6 Claims, 8 Drawing Sheets

X
X1
X2
Y
W
Rb
3
C
G
B1
(B)
30
V
R3
Fa
B2
(B)

ARTICLE SORTING FACILITY

CROSS-REFERENCE TO RELATED APPLICATION

This application claims priority to Japanese Patent Application No. 2023-169633 filed Sep. 29, 2023, the disclosure of which is hereby incorporated by reference in its entirety.

BACKGROUND OF THE INVENTION

1. Field of the Invention

The present invention relates to an article sorting facility including a plurality of transport vehicles each travelling on a floor and transporting articles to sort the articles.

2. Description of Related Art

In an article sorting facility in a logistics warehouse or the like, a plurality of processes such as supplying, transporting, and sorting of articles are performed, and a plurality of transport devices are used between these processes. One example of such a facility is disclosed in JP 04-350019A. In the following description of the related art, the reference symbols in parentheses are those used in JP 04-350019A.

In the facility disclosed in JP 04-350019A, an article (W) transported to an unloading station (9) by a stacker crane (4) is supplied to an area where a worker (M) is present. The worker (M) performs work to transfer the supplied article (W) to a conveyor (11) in accordance with instructions or the like. The article (W) is transported by the conveyor (11) to the location where the next process is performed.

In the facility disclosed in JP 04-350019A, the article (W) supplied from the stacker crane (4) and the unloading station (9) is transferred to the conveyor (11) for transport, but it is also conceivable to use an unmanned transport vehicle that travels independently instead of the conveyor (11). This allows each transport vehicle to transport articles at its own time and route, and increases transportation flexibility for the entire facility. However, when a plurality of transport vehicles are used as transport devices instead of conveyors, the efficiency of supplying articles to the transport devices may decrease due to the intermittent transport of articles by the plurality of transport vehicles.

SUMMARY OF THE INVENTION

In view of the above circumstances, it is desirable to improve the efficiency of supplying articles to transport vehicles in an article sorting facility including transport vehicles.

The following are aspects of technology for solving the foregoing problem.

An article sorting facility including a plurality of transport vehicles each travelling on a floor and transporting articles to sort the articles, wherein the floor includes: a transfer area where transfer work is performed to transfer the articles to the transport vehicles; a receiving area where the articles transported by the transport vehicles are received; and a connection area connecting the transfer area and the receiving area, with a Y direction being a specific direction among directions extending along the floor, an X direction being a direction orthogonal to the Y direction among the directions extending along the floor, a first side in the X direction being one side in the X direction, and a second side in the X direction being another side in the X direction, the transfer area includes: at least one transfer passage extending in the Y direction; a first transfer section disposed on the first side in the X direction relative to the transfer passage and where the transfer work for transfer to the transport vehicles on the transfer passage is performed; and a second transfer section disposed on the second side in the X direction relative to the transfer passage and where the transfer work for transfer to the transport vehicles on the transfer passage is performed, and the transfer passage includes: a first stop position for the transport vehicles to be supplied with the articles by the transfer work in the first transfer section to stop; and a second stop position for the transport vehicles to be supplied with the articles by the transfer work in the second transfer section to stop, the first stop position and the second stop position being set at different positions on the transfer passage.

In this configuration, the first transfer section and the second transfer section where transfer work for transfer to the transport vehicles on the transfer passage is performed are disposed on both sides in the X direction with respect to the transfer passage. Therefore, with this configuration, the supply amount of the articles supplied to the transport vehicles can be at least doubled in the entire transfer area. The transfer passage includes: a first stop position for the transport vehicles to be supplied with the articles by the transfer work in the first transfer section to stop; and a second stop position for the transport vehicles to be supplied with the articles by the transfer work in the second transfer section to stop, the first stop position and the second stop position being set at different positions on the transfer passage. Therefore, it is possible to prevent interference between a transport vehicle to be supplied with articles from the first transfer section and another transport vehicle to be supplied with articles from the second transfer section on the transfer passage. As described above, with this configuration, it is possible to prevent interference between transport vehicles and increase the efficiency of supplying articles to the transport vehicles throughout the facility.

Further features and advantages of the technology according to the present disclosure will become clearer from the following description of illustrative and non-limiting embodiments given with reference to the drawings.

BRIEF DESCRIPTION OF THE DRAWINGS

The terms FIG., FIGS., Figure, and Figures are used interchangeably in the specification to refer to the corresponding figures in the drawings.

DESCRIPTION OF THE INVENTION

An article sorting facility is a facility including a plurality of transport vehicles each travelling on floors and transporting articles to sort the articles. Hereinafter, embodiments of the article sorting facility will be described with reference to the drawings.

In this specification, a specific direction among the directions along the floors is referred to as a "Y direction", and a direction perpendicular to the Y direction among the directions along the floors is referred to as an "X direction". One side in the X direction is referred to as a "first side X1 in the X direction", and the other side in the X direction is referred to as a "second side X2 in the X direction". One side in the Y direction is referred to as a "first side Y1 in the Y direction", and the other side in the Y direction is referred to as a "second side Y2 in the Y direction".

Figure 1:
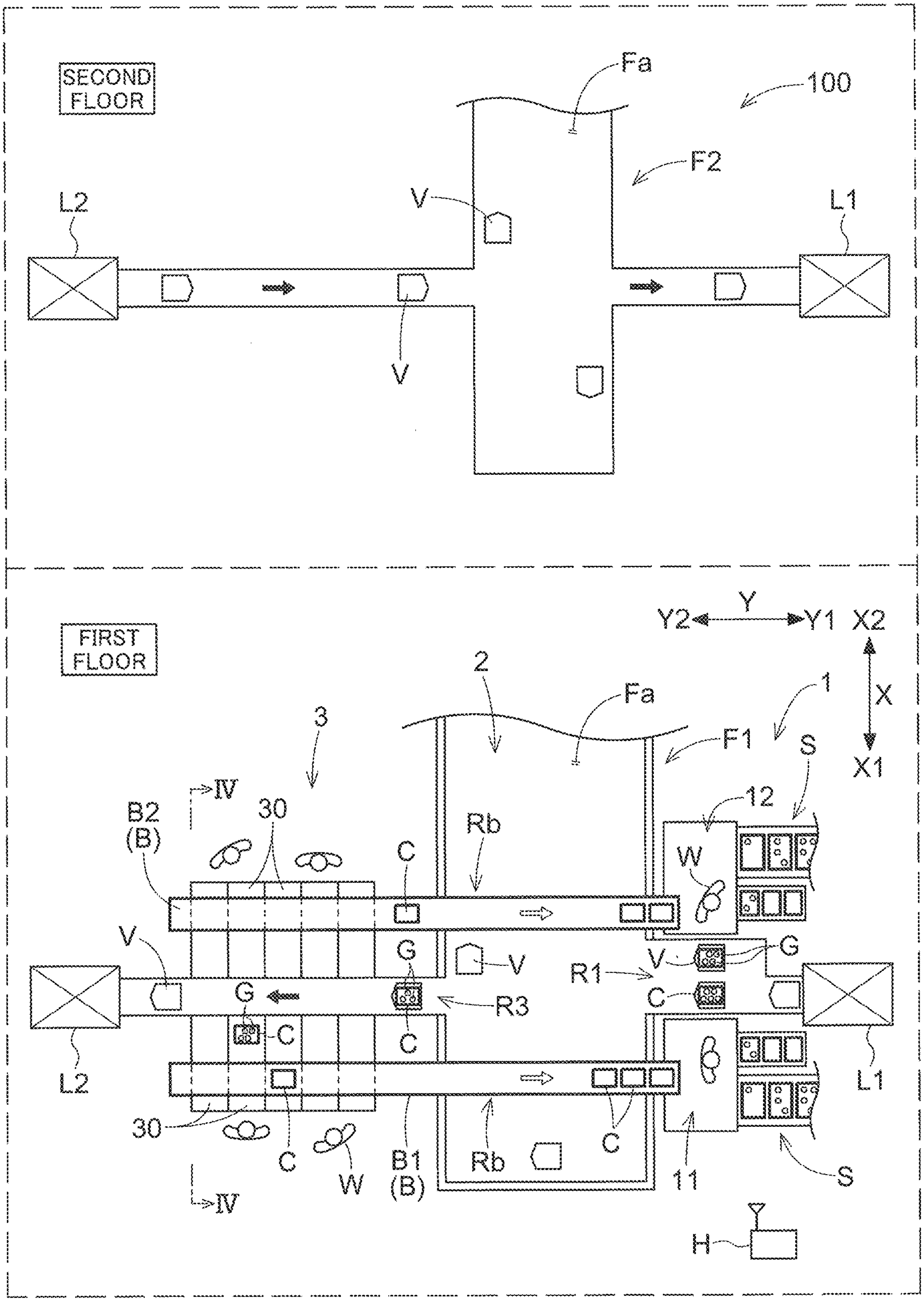
FIG. 1 is a plan view showing first and second floors of an article sorting facility.

As shown in FIG. 1, in the present embodiment, an article sorting facility 100 includes a first floor F1 and further includes a second floor F2 disposed at a different position in the vertical direction from the first floor F1. FIG. 1 illustrates an article sorting facility 100 having two levels. The first floor F1 is disposed on the first level and the second floor F2 is disposed on the second level. A plurality of transport vehicles V are each configured to travel on travel surfaces Fa of the first floor F1 and the second floor F2. Each transport vehicle V is capable of moving between the first floor F1 and the second floor F2 by using a first lifter L1 and a second lifter L2, which will be described later. Note that the article sorting facility 100 is not limited to the above configuration, and may have one level, or three or more levels.

The first floor F1 includes: a transfer area 1 where transfer work is performed to transfer articles G to transport vehicles V; a receiving area 3 where the articles G transported by the transport vehicles V are received; and a connection area 2 that connects the transfer area 1 and the receiving area 3.

The transfer area 1 is disposed on the first side Y1 in the Y direction relative to the connection area 2. The transfer area 1 includes: transfer passages R1 extending in the Y direction; a first transfer section 11 disposed on the first side X1 in the X direction relative to the transfer passages R1 and where transfer work for transfer to transport vehicles V on the transfer passages R1 is performed; and a second transfer section 12 disposed on the second side X2 in the X direction relative to the transfer passages R1 and where transfer work for transfer to transport vehicles V on the transfer passages R1 is performed. Thus, in this configuration, the first transfer section 11 and the second transfer section 12, where transfer work is performed, are disposed on both sides in the X direction with respect to the transfer passages R1, so that the supply amount of articles G to the transport vehicles V can be increased in the entire transfer area 1.

In the present embodiment, the connection area 2 is formed in a planar shape extending in both the X direction and the Y direction on the first floor F1. The transport vehicles V are capable of travelling freely at least in the connection area 2 of the first floor F1. In the present embodiment, each transport vehicle V is configured to travel straight ahead and to change direction on the spot by performing a turning operation to turn about a vertical axis. Each transport vehicle V are capable of travelling freely in the connection area 2 by performing straight travel and turning operation.

The receiving area 3 is disposed on the second side Y2 in the Y direction relative to the connection area 2. The receiving area 3 has a receiving passage R3 extending in the Y direction. In the receiving area 3, a plurality of receiving sections 30 are arranged, each configured to receive articles G from a transport vehicle V. The plurality of receiving sections 30 are each configured to receive articles G from a transport vehicle V travelling through the receiving passage R3.

In the present embodiment, the article sorting facility 100 includes a control device H that controls each of the plurality of transport vehicles V. The control device H is configured to be able to communicate with each transport vehicle V. The control device H is configured to manage the conditions in the transfer area 1 and the receiving area 3, and to transmit to each transport vehicle V a transport command specifying the origin and destination of an article G. The control device H is also configured to be able to grasp current position information regarding each of the transport vehicles V, and also to specify the paths along which the transport vehicles V should travel. As a result, it is possible to realize smooth travel of each transport vehicle V within the facility. The control device H includes, for example, a processor such as a microcomputer, and peripheral circuits such as a memory. Each function is realized by cooperation between these pieces of hardware and a program executed on the processor of a computer or the like.

Figure 2:
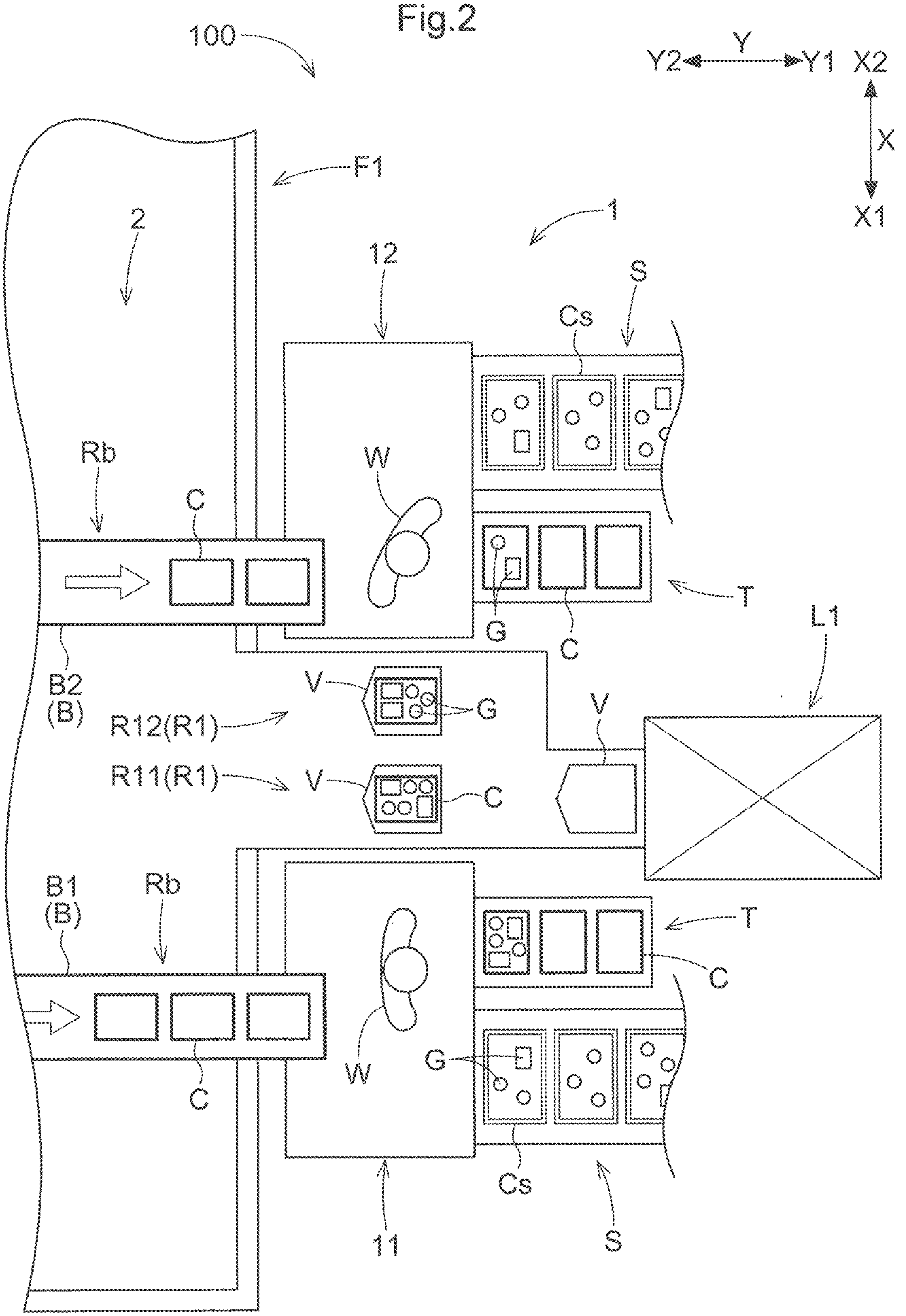
FIG. 2 is a plan view showing main parts of a transfer area.

As shown in FIG. 2, articles G are supplied to the transfer area 1 by article supply sections S. The article supply sections S are each configured to supply articles G stored in a supply containers Cs to the transfer area 1. The articles G stored in the supply containers Cs are supplied by the article supply sections S to each of the first transfer section 11 and the second transfer section 12 in the transfer area 1.

In the present embodiment, containers C, each capable of storing articles G, are arranged in the transfer area 1. In the illustrated example, the first transfer section 11 and the second transfer section 12 are each provided with a temporary placement table T on which containers C are placed.

Figure 3A:
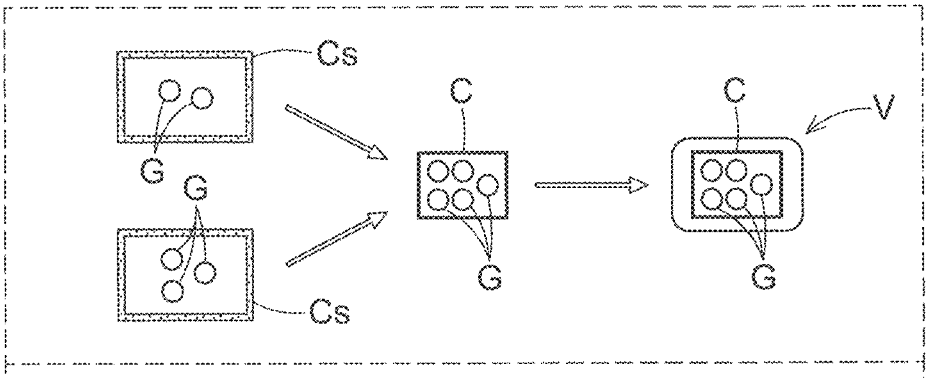
FIG. 3A and FIG. 3B are diagrams illustrating a transfer work performed in the transfer area.
Figure 3B:
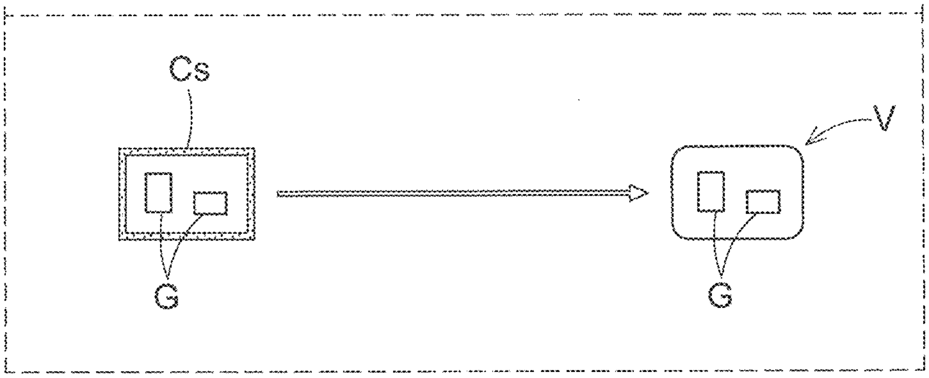

In the transfer work performed in the transfer area 1, articles G stored in a supply container Cs are removed, and these articles G are transferred to a transport vehicle V on a transfer passage R1. As shown in FIG. 3A, the transfer of articles G to a transport vehicle V is performed in a state where a plurality of articles G (or a single article G) removed from a plurality of supply containers Cs (or a single supply container Cs) are stored in a container C. Alternatively, as shown in FIG. 3B, the transfer may be performed such that a plurality of articles G (or a single article G) removed from a supply container Cs are transferred directly to a transport vehicle V without storing the articles G in a container C. In the present embodiment, the transfer work in the transfer area 1 is performed by a worker W. However, the transfer work may be performed by a robot instead of the worker W, or may be performed by both the worker W and the robot.

As shown in FIG. 2, in the present embodiment, the transfer passages R1 include a first transfer passage R11 and a second transfer passage R12 disposed adjacent to the first transfer passage R11 on the second side X2 in the X direction. The first transfer section 11 is disposed on the first side X1 in the X direction relative to the first transfer passage R11. In the transfer work performed in the first transfer section 11, articles G are transferred to the transport vehicle V on the first transfer passage R11. The second transfer section 12 is disposed on the second side X2 in the X direction relative to the second transfer passage R12. In the transfer work performed in the second transfer section 12, articles G are transferred to the transport vehicle V on the second transfer passage R12.

The transport vehicles V are each configured to transport the articles G received in the transfer area 1 or the container C in which the articles G are stored to the receiving area 3. In the present embodiment, the transport vehicles V travel from the transfer area 1 to the receiving area 3 via the connection area 2 (see FIG. 1).

Figure 4:
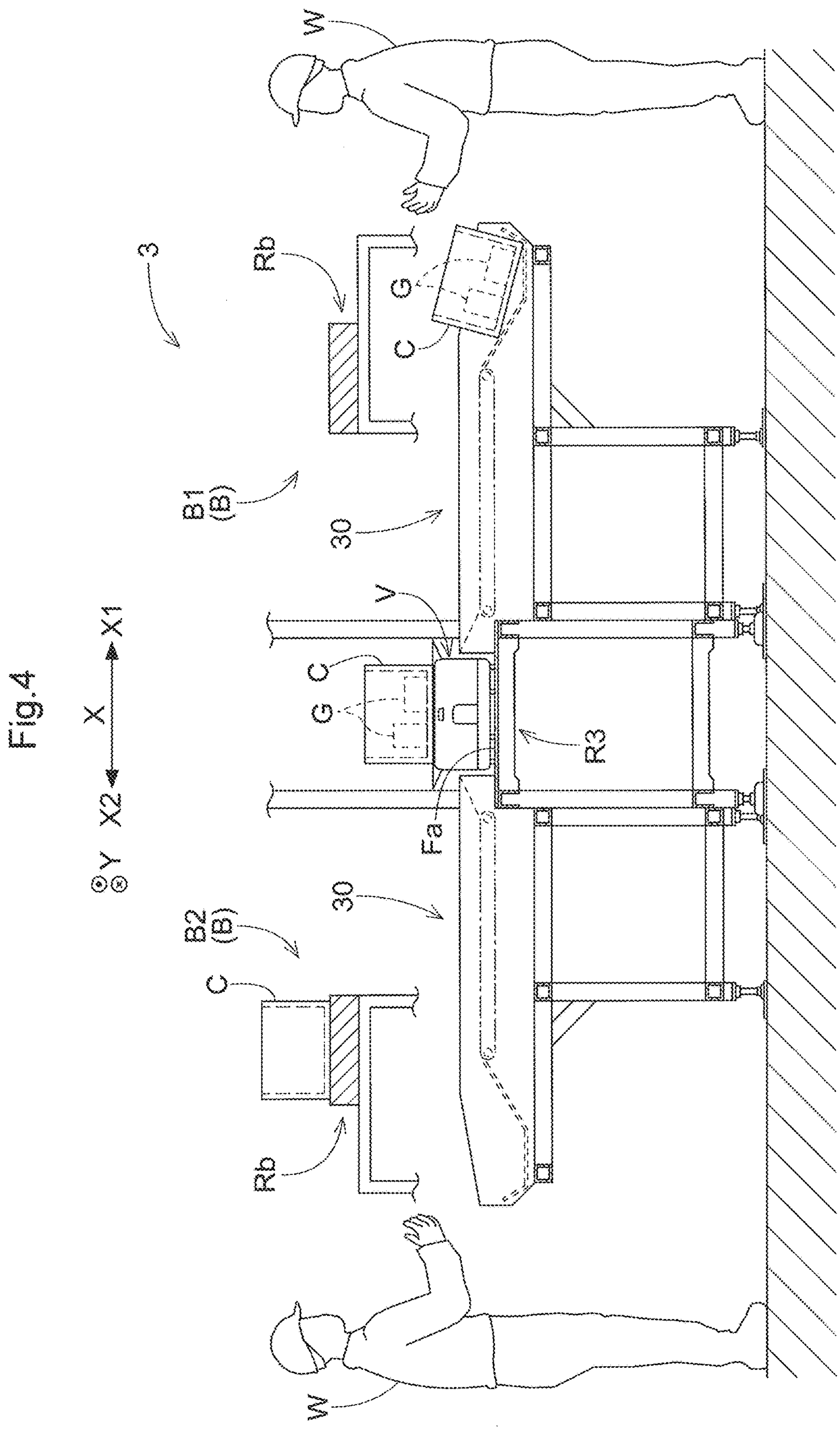
FIG. 4 is a cross-sectional view taken along a line IV-IV in FIG. 1.

As shown in FIG. 4, in the receiving area 3, sorting work is performed to sort the articles G transported by the transport vehicles V. Sorting work is performed based on predetermined order information. For example, order information includes various kinds of information such as customer information, shipping destination information, and article type information.

In the present embodiment, the plurality of receiving sections 30 are each formed using a conveyor (hereinafter, the receiving sections 30 may be referred to as "receiving conveyors 30"). In this example, the plurality of receiving conveyors 30 are disposed on both sides in the X direction with respect to the receiving passage R3. The plurality of receiving conveyors 30 extend from the receiving passage R3 in the X direction, and each transport the articles G received from the transport vehicles V, in the X direction. Note that the present invention is not limited to the above configuration, and at least some of the plurality of receiving sections 30 may be formed using chutes instead of conveyors.

When a transport vehicle V transports articles G stored in a container C to the receiving area 3, removal work is performed in the receiving area 3 to remove the articles G from the container C transported by the transport vehicle V. That is to say, the sorting work includes the removal work performed to remove the articles G from the containers C transported by the transport vehicles V. As a result of this removal work, the containers C and the articles G are separated, resulting in empty containers C.

When a transport vehicle V transports articles G (articles G that are not stored in a container C) to the receiving area 3, receiving work is performed in the receiving area 3 to receive the articles G transported by the transport vehicle V. The articles G removed from the container C by the removal work and the articles G received by the receiving work are, for example, stored in containers (not shown) according to their shipping destinations. In the present embodiment, the sorting work in the receiving area 3 is performed by a worker W. However, the sorting work may be performed by a robot instead of the worker W, or may be performed by both the worker W and the robot.

In the present embodiment, the article sorting facility 100 includes empty container collecting devices B that collect the containers C emptied by the above-mentioned removal work. As shown in FIG. 1, collecting paths Rb, which are paths along which empty containers C are transported by the empty container collecting devices B, extend to a position adjacent to the first transfer section 11 and a position adjacent to the second transfer section 12, respectively. The empty containers C collected by the empty container collecting devices B are transported along the collecting paths Rb to the transfer area 1 and used for the work in the transfer area 1. The empty container collecting devices B are formed using conveyors, for example. The empty container collecting devices B formed using conveyors extend along the collecting paths Rb.

In the present embodiment, the empty container collecting devices B include a first empty container collecting device B1 that transports empty containers C to the first transfer section 11 and a second empty container collecting device B2 that transports empty containers C to the second transfer section 12. The first empty container collecting device B1 is configured to transport, to the first transfer section 11, the containers C emptied in the receiving sections 30 disposed on the first side X1 in the X direction relative to the receiving passage R3, along the collecting path Rb connecting the receiving sections 30 and the first transfer section 11. The second empty container collecting device B2 is configured to transport, to the second transfer section 12, the containers C emptied in the receiving sections 30 disposed on the second side X2 in the X direction relative to the receiving passage R3, along the other collecting path Rb connecting the receiving sections 30 and the second transfer section 12.

In the present embodiment, the first lifter L1 (corresponding to the lifter), which raises and lowers transport vehicles V between the first floor F1 and the second floor F2, is disposed on the first side Y1 in the Y direction relative to the first transfer passage R11 and the second transfer passage R12 (see also FIG. 2). The second lifter L2 is disposed on the second side Y2 in the Y direction relative to the receiving passage R3. As with the first lifter L1, the second lifter L2 is configured to raise and lower transport vehicles V between the first floor F1 and the second floor F2. In this example, the first lifter L1 is a lowering lifter that moves transport vehicles V from the second floor F2 to the first floor F1. The second lifter L2 is a raising lifter that moves transport vehicles V from the first floor F1 to the second floor F2.

Figure 5:
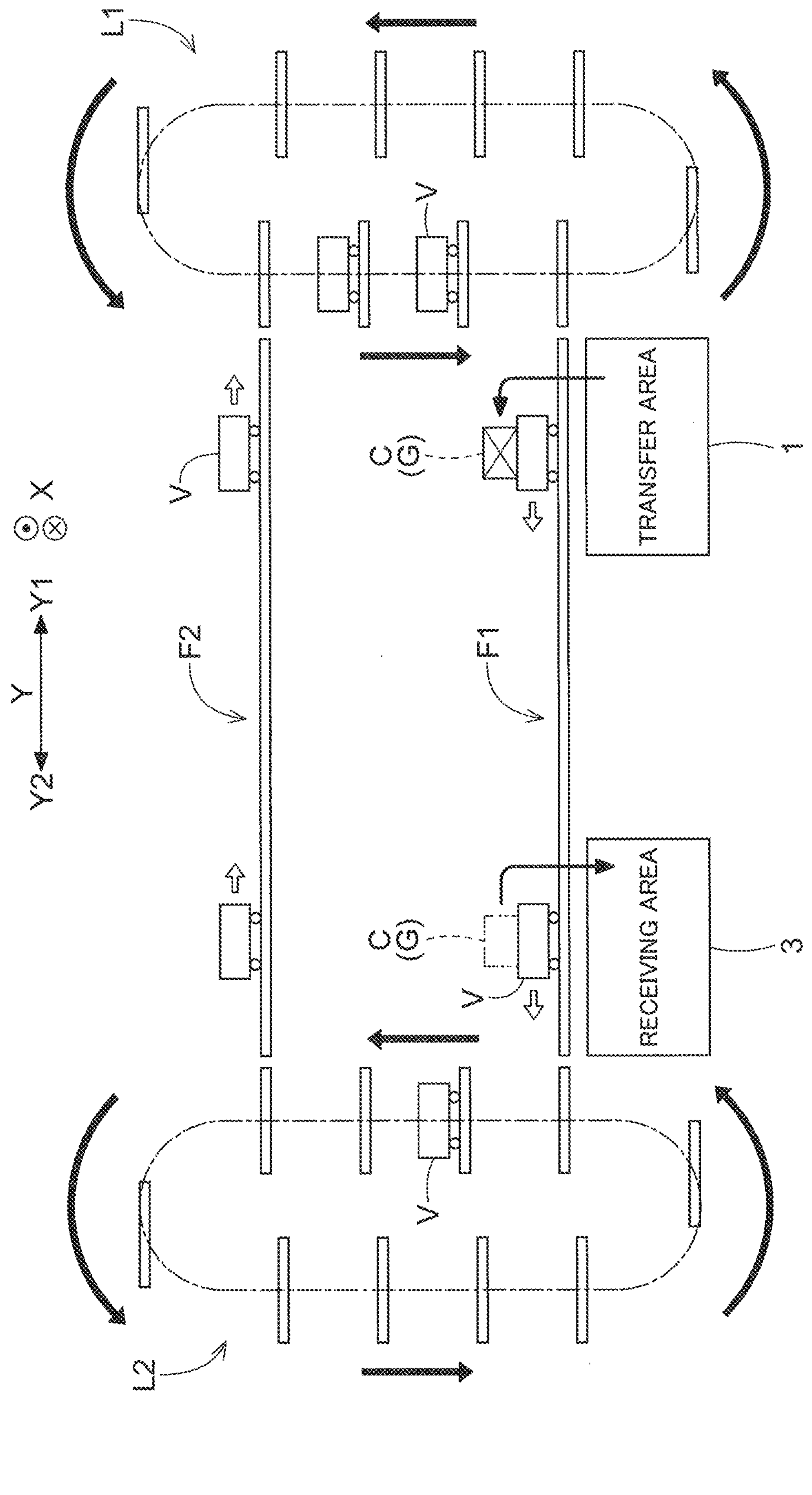
FIG. 5 is a diagram illustrating how transport vehicles circulate between the floors.

As shown in FIG. 5, each transport vehicle V, after transferring the articles G received from the transfer area 1 to the receiving area 3 on the first floor F1, rides the second lifter L2 and goes to the second floor F2, which is on the other level. Thereafter, the transport vehicle V travels on the second floor F2 and rides the first lifter L1, and returns to the first floor F1, which is on the level where the above-mentioned transfer area 1 and receiving area 3 are disposed. The returning transport vehicle V receives articles G in the transfer area 1, and transports the articles G to the receiving area 3, in the same manner as described above. In this way, each transport vehicle V circulates between the first floor F1 and the second floor F2, thereby repeatedly executing a series of tasks of transporting the articles G received in the transfer area 1 to the receiving area 3.

Next, the operation of transport vehicles V in the transfer area 1 will be described with reference to FIGS. 6 to 9.

The transfer passages R1 include: a first stop position P1 for a transport vehicle V to be supplied with articles G by the transfer work in the first transfer section 11 to stop; and a second stop position P2 for a transport vehicle V to be supplied with articles G by the transfer work in the second transfer section 12 to stop, which are set at different positions on the transfer passages R1. Thus, in this configuration, the first stop position P1 and the second stop position P2 are set at different positions on the transfer passages R1 so that interference between a transport vehicle V to be supplied with articles G from the first transfer section 11 and another transport vehicle V to be supplied with articles G from the second transfer section 12 on the transfer passages R1 can be avoided.

In the present embodiment, the first stop position P1 is set in a section of the first transfer passage R11.

The second stop position P2 is set in a section of the second transfer passage R12. As a result, it is easier to avoid interference between the transport vehicles V on the transfer passages R1. Each transport vehicle V is configured to stop at the first stop position P1 on the first transfer passage R11 to be supplied with articles G from the first transfer section 11. In addition, each transport vehicle V is configured to stop at the second stop position P2 on the second transfer passage R12 to be supplied with articles G from the second transfer section 12.

In the present embodiment, the first transfer passage R11 and the second transfer passage R12 are each connected to the first lifter L1 via one common path Rc. That is to say, each transport vehicle V that has exited the first lifter L1 necessarily passes through the common path Rc, and thereafter selectively travels along the first transfer passage R11 or the second transfer passage R12. In this example, the selection of whether to travel along the first transfer passage R11 or the second transfer passage R12 is made based on a command from the control device H.

In the present embodiment, the transfer passages R1 are divided into a plurality of segments. Each segment has an area on which one transport vehicle V can be present. The presence of a plurality of transport vehicles V on a single segment is not allowed.

Each segment has a different address. The control device H specifies a series of consecutive addresses for each transport vehicle V to specify a path along which the transport vehicle V should travel. In the figures, the three-digit numbers shown on the path represent the address of each segment. Although detailed illustration is omitted, each segment is provided with a position information storage section (for example, a one-dimensional code, a two-dimensional code, an IC tag, or the like) that stores address information corresponding to the segment. Each transport vehicle V travels along a specified path while reading the position information storage sections. Note that not only the transfer passages R1, but also the areas on the first floor F1 and the second floor F2 in which the transport vehicles V can travel are divided into a plurality of segments, each having a unique address. This allows the control device H to control the travel of the transport vehicles V throughout the first floor F1 and the second floor F2.

In the present embodiment, the first transfer passage R11 is continuous with the common path Rc. In this example, the first transfer passage R11 is continuous with the common path Rc in a straight line. In the illustrated example, addresses 102 and 103 specify the common path Rc. Addresses 104, 105, and 106, which are continuous with the common path Rc, specify the first transfer passage R11. The address 104 on the first transfer passage R11 is set as the first stop position P1.

In the present embodiment, the second transfer passage R12 branches from the common path Rc to the second side X2 in the X direction. In this example, the second transfer passage R12 branches from the common path Rc and extends parallel to the first transfer passage R11. In the illustrated example, an address 203, which is shifted from the common path Rc to the second side X2 in the X direction, and addresses 204, 205, and 206 successive to the address 203 in the Y direction specify the second transfer passage R12. The address 204 on the second transfer passage R12 is set as the second stop position P2.

As illustrated, in the present embodiment, the first stop position P1 and the second stop position P2 are set at positions adjacent to each other in the X direction. In other words, the first stop position P1 and the second stop position P2 are set at the same position in the Y direction.

A waiting area A in which a plurality of transport vehicles V or a single transport vehicle V can wait is set between the branching point of the second transfer passage R12 from the common path Rc and the second stop position P2. In the illustrated example, a waiting area A in which one transport vehicle V can wait is set. The address 203 on the second transfer passage R12 specifies the waiting area A.

In the present embodiment, each transport vehicle V that has exited the first lifter L1 on the first floor F1 preferentially travels along the second transfer passage R12. In this example, each transport vehicle V preferentially travels along the second transfer passage R12 based on a command from the control device H. FIGS. 6 to 9 show the priority travel of a transport vehicle V in various situations.

Figure 6:
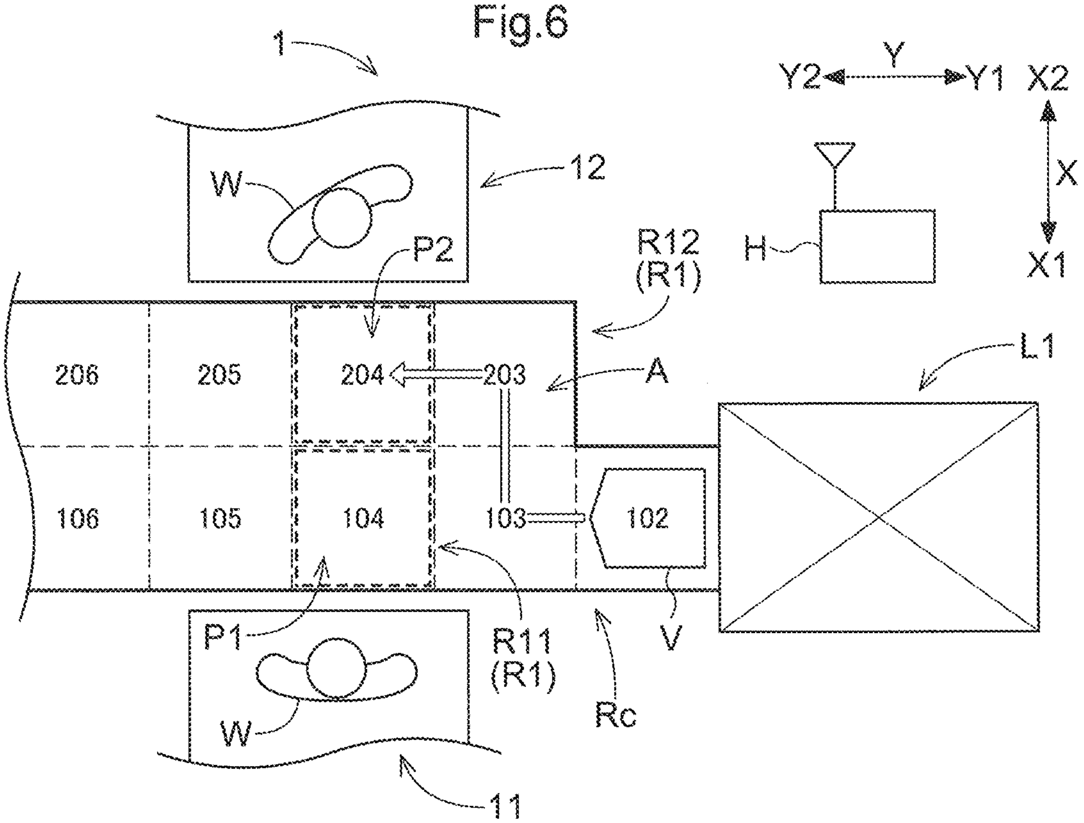
FIG. 6 is a diagram illustrating priority travel of a transport vehicle on a transfer passage.

As shown in FIG. 6, if there are no other transport vehicles V at either the first stop position P1 or the second stop position P2, the transport vehicle V selects the second stop position P2 as its destination (to be precise, the position is selected by the control device H; the same applies below). In this case, the transport vehicle V that has exited the first lifter L1 moves to the second transfer passage R12 branching from the common path Rc. Thereafter, the transport vehicle V stops at the second stop position P2 and is supplied with articles G from the second transfer section 12.

Figure 7:
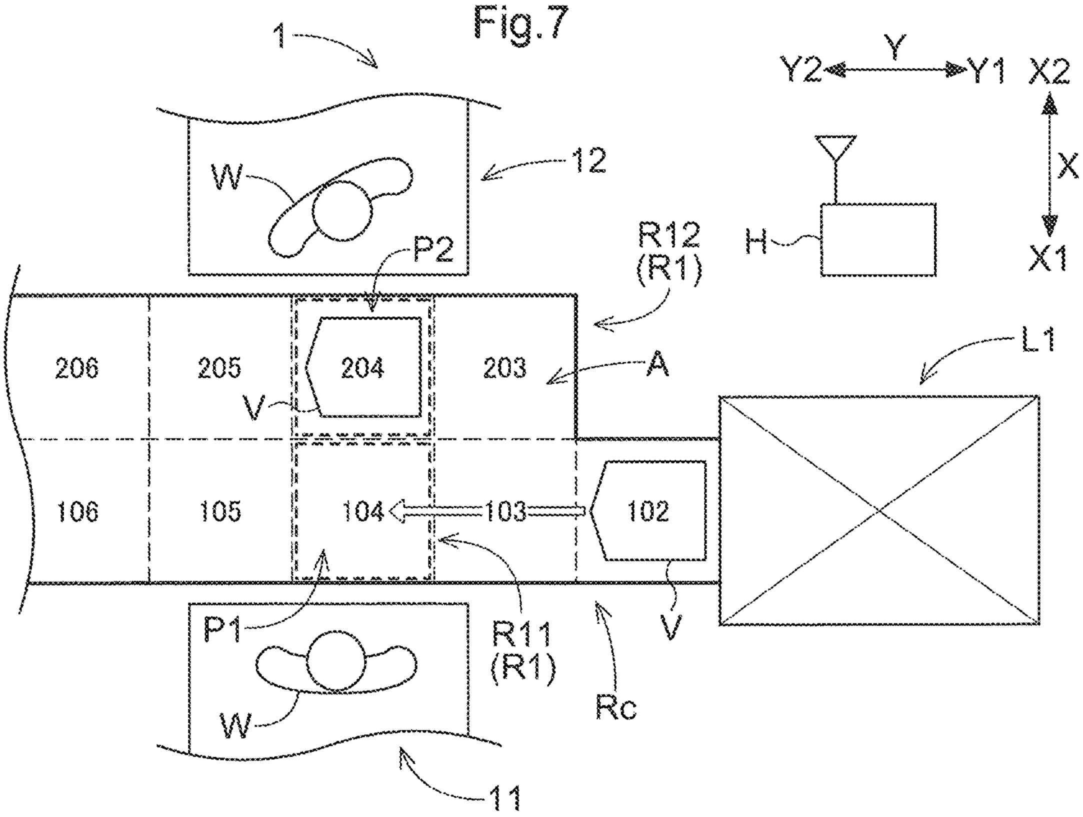
FIG. 7 is a diagram illustrating priority travel of a transport vehicle on a transfer passage.

As shown in FIG. 7, when there is another preceding transport vehicle V at the second stop position P2 and there are no other transport vehicles V at the first stop position P1, the transport vehicle V selects the first stop position P1 as its destination. In this case, the transport vehicle V that has exited the first lifter L1 moves from the common path Rc to the first transfer passage R11. Thereafter, the transport vehicle V stops at the first stop position P1 and is supplied with articles G from the first transfer section 11.

Figure 8:
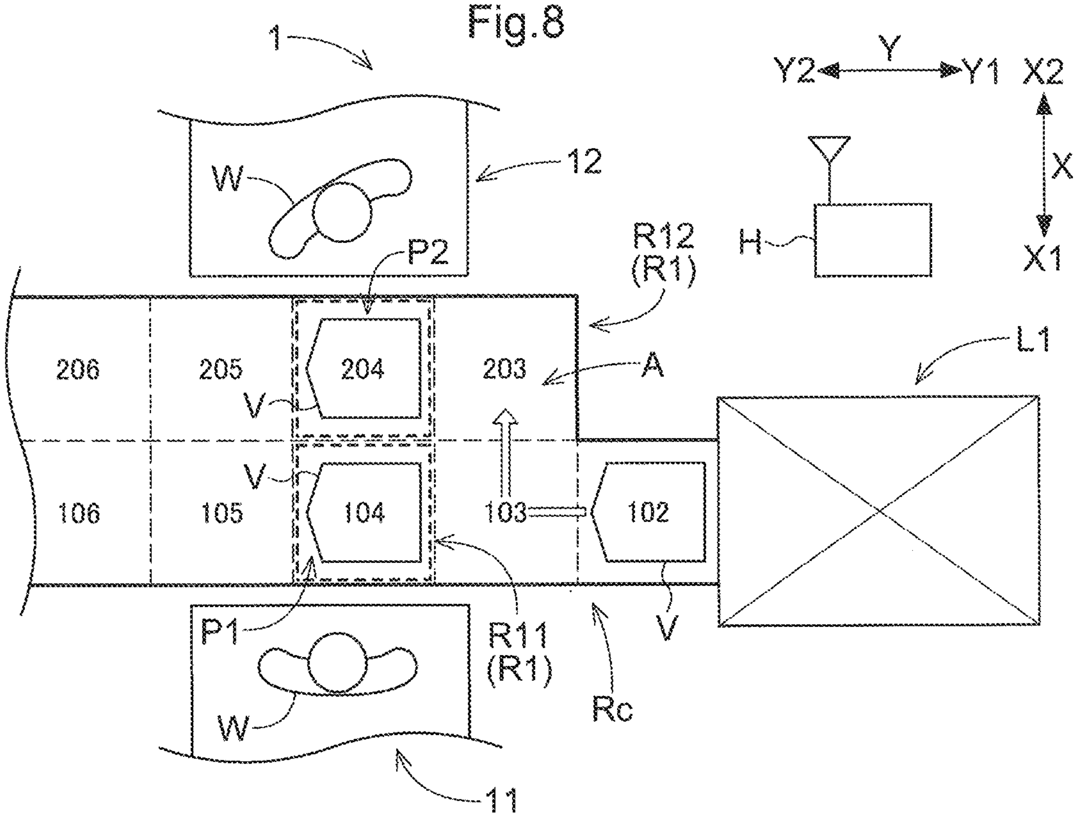
FIG. 8 is a diagram illustrating priority travel of a transport vehicle on a transfer passage.

As shown in FIG. 8, if there are other transport vehicles V at both the first stop position P1 and the second stop position P2, the transport vehicle V selects the second stop position P2 as its destination. In this case, the transport vehicle V that has exited the first lifter L1 moves to the second transfer passage R12 branching from the common path Rc. Since the other preceding transport vehicle V has stopped at the second stop position P2, the transport vehicle V waits in the waiting area A. When the other preceding transport vehicle V receives the supplied articles G and leaves the second stop position P2, the transport vehicle V moves toward the second stop position P2, which has become vacant.

Figure 9:
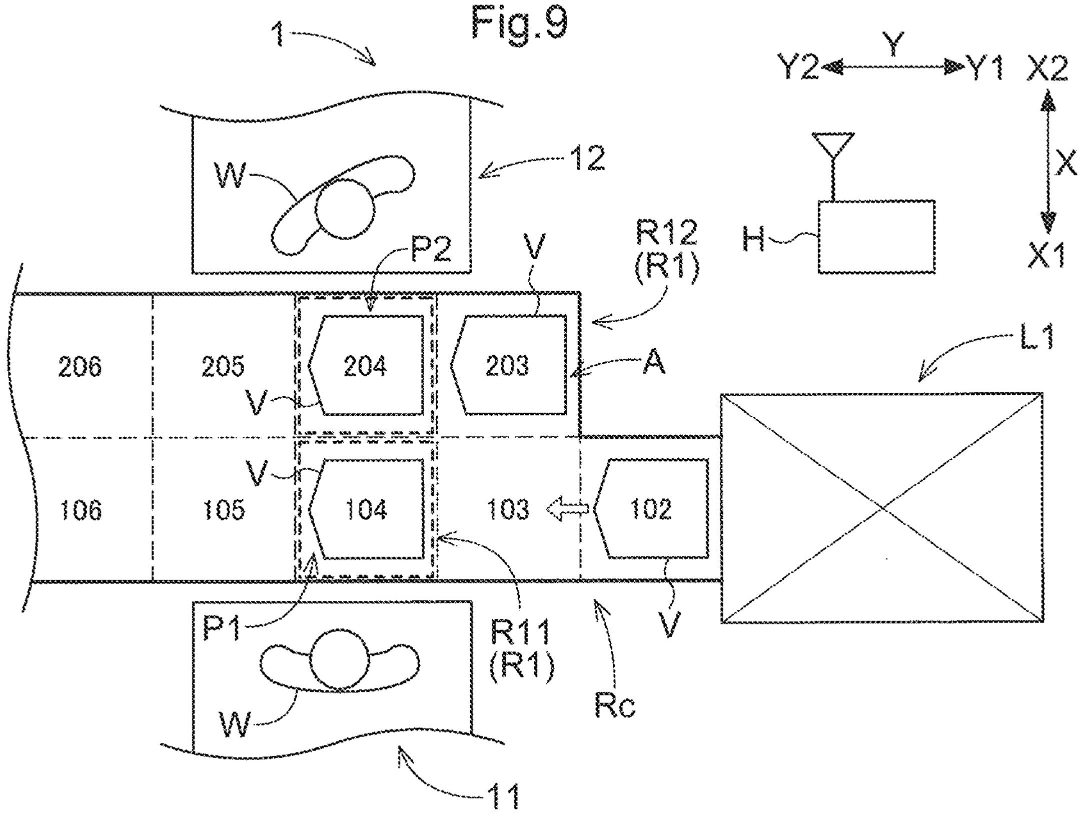
FIG. 9 is a diagram illustrating priority travel of a transport vehicle on a transfer passage.

As shown in FIG. 9, if there are other transport vehicles V at both the first stop position P1 and the second stop position P2 and another transport vehicle Vis waiting in the waiting area A, the transport vehicle V selects the first stop position P1 as its destination. In this case, the transport vehicle V that has exited the first lifter L1 waits on the common path Rc until the other preceding transport vehicle V leaves the first stop position P1. When the other preceding transport vehicle V receives the supplied articles G and leaves the first stop position P1, the transport vehicle V moves toward the first stop position P1, which has become vacant.

When the common path Rc connected to the first transfer passage R11 and the second transfer passage R12 on their upstream side is congested, the smooth travel of transport vehicles Vis hindered on both the first transfer passage R11 and the second transfer passage R12. However, as described above, the transport vehicle V is configured to travel through the second transfer passage R12 in preference to the first transfer passage R11, and therefore the first transfer passage R11 continuing from the common path Rc is less likely to become congested. This makes it possible to prevent congestion on the common path Rc as well, and as a result, it becomes easier to realize the smooth travel of transport vehicles V on both the first transfer passage R11 and the second transfer passage R12.

Other Embodiments

Next, other embodiments will be described.

Figure 10:
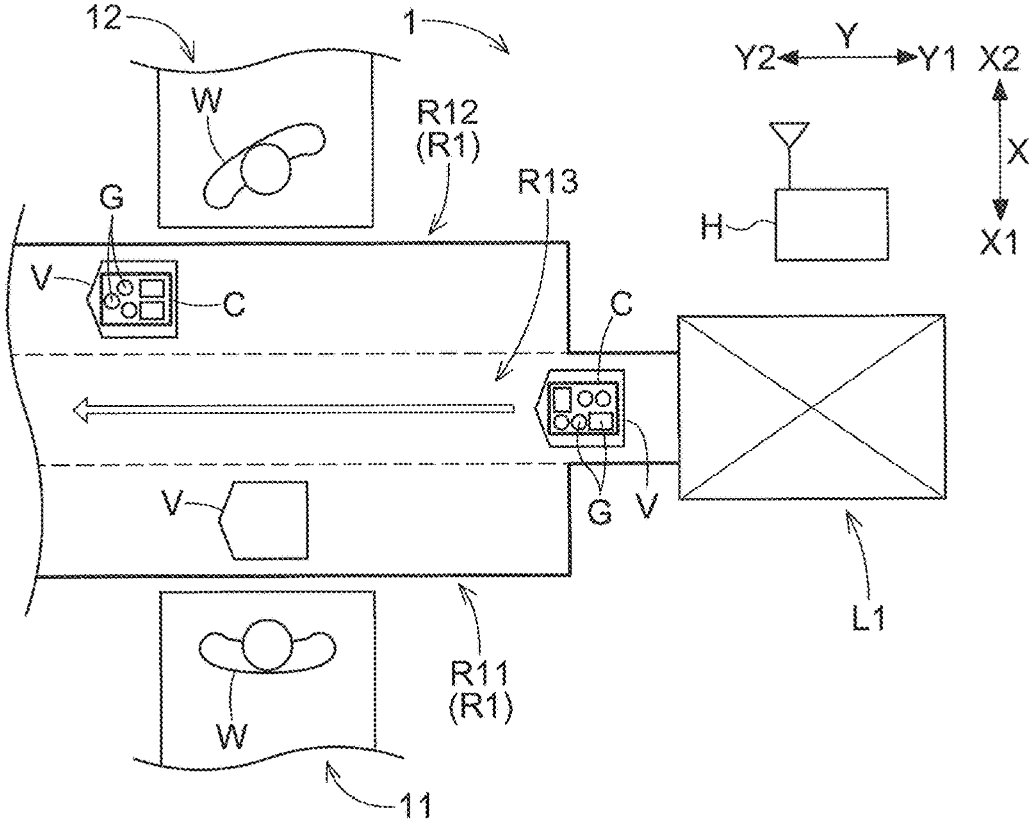
FIG. 10 is a diagram showing a configuration of a transfer area according to another embodiment.

(1) The above embodiment describes an example in which the first transfer passage R11 and the second transfer passage R12 are adjacent to each other in the X direction. However, the present invention is not limited to such an example. For example, as shown in FIG. 10, a transit path R13 for allowing the passage of transport vehicles V that are not to be supplied with articles G in the transfer area 1 may be disposed between the first transfer passage R11 and the second transfer passage R12 in the X direction. The "transport vehicles V that are not to be supplied with articles G" are transport vehicles V that are already holding articles G. Such a situation may occur in the following case: even if a transport vehicle V holding articles G enters the receiving area 3, there may be a case in which the receiving area 3 cannot accept the articles G. In such a case, the transport vehicle V travels from the first floor F1 to the second floor F2 while holding the articles G in order to wait for the next opportunity for the acceptance, and thereafter rides the first lifter L1 to return to the first floor F1 again (as shown in FIG. 5, the transport vehicle V circulates between the first floor F1 and the second floor F2). In such a case, the transport vehicle V that has exited the first lifter L1 does not need to be supplied with articles G in the transfer area 1, and therefore the transport vehicle V passes through the transit path R13 and goes to the receiving area 3.

Figure 11:
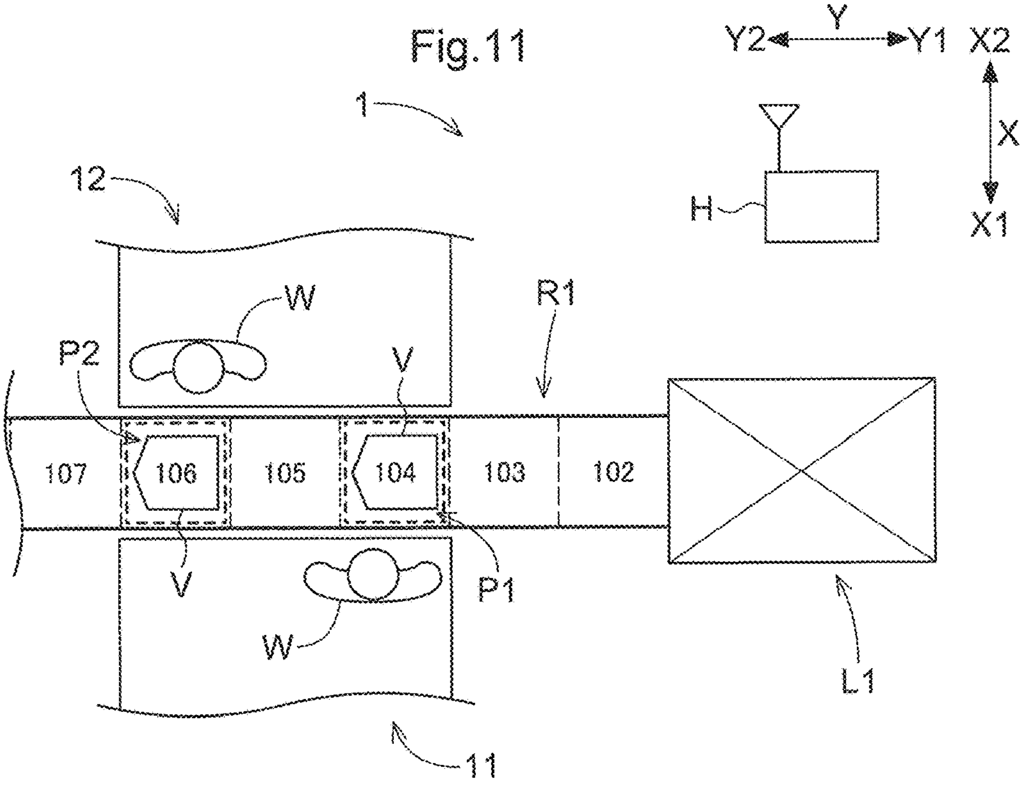
FIG. 11 is a diagram showing a configuration of a transfer area according to another embodiment.

(2) The above embodiment describes an example in which the transfer passages R1 include the first transfer passage R11 and the second transfer passage R12. However, the present invention is not limited to such an example, and for example, as shown in FIG. 11, the transfer passages R1 may be formed as a single path. In this case, the first stop position P1 and the second stop position P2 are set at different positions in the Y direction on a single transfer passage R1. In the illustrated example, the first stop position P1 is set at the address 104 and the second stop position P2 is set at the address 106 on the transfer passage R1.

(3) The above embodiment describes an example in which the first transfer passage R11 is continuous with the common path Rc in a straight line and the second transfer passage R12 branches from the common path Rc in the X direction. However, the present invention is not limited to such an example, and both the first transfer passage R11 and the second transfer passage R12 may branch from the common path Rc.

(4) The above embodiment describes an example in which the waiting area A, where one transport vehicle V can wait, is set on the second transfer passage R12. However, the present invention is not limited to such an example, and a waiting area A where two or more transport vehicles V can wait may be set on the second transfer passage R12.

(5) The above embodiment describes an example in which the transfer area 1 includes two transfer sections, namely the first transfer section 11 and the second transfer section 12. However, the present invention is not limited to such an example, and the transfer area 1 may include three or more transfer sections.

(6) The above embodiment describes an example of a configuration including one pair of transfer area 1 and receiving area 3. However, the article sorting facility 100 may include a plurality of pairs of transfer area 1 and receiving area 3. In this case, the pairs are arranged in the X direction.

(7) Note that the configurations disclosed in the above-described embodiments can also be applied in combination with configurations disclosed in other embodiments as long as no contradiction arises. Regarding such other configurations as well, the embodiments disclosed in this specification are merely examples in all respects. Therefore, various modifications can be made as appropriate without departing from the spirit of the present disclosure.

Summary of Embodiments

A summary of the embodiments will be described below.

An article sorting facility including a plurality of transport vehicles each travelling on a floor and transporting articles to sort the articles, wherein the floor includes: a transfer area where transfer work is performed to transfer the articles to the transport vehicles; a receiving area where the articles transported by the transport vehicles are received; and a connection area connecting the transfer area and the receiving area, with a Y direction being a specific direction among directions extending along the floor, an X direction being a direction orthogonal to the Y direction among the directions extending along the floor, a first side in the X direction being one side in the X direction, and a second side in the X direction being another side in the X direction, the transfer area includes: at least one transfer passage extending in the Y direction; a first transfer section disposed on the first side in the X direction relative to the transfer passage and where the transfer work for transfer to the transport vehicles on the transfer passage is performed; and a second transfer section disposed on the second side in the X direction relative to the transfer passage and where the transfer work for transfer to the transport vehicles on the transfer passage is performed, and the transfer passage includes: a first stop position for the transport vehicles to be supplied with the articles by the transfer work in the first transfer section to stop; and a second stop position for the transport vehicles to be supplied with the articles by the transfer work in the second transfer section to stop, the first stop position and the second stop position being set at different positions on the transfer passage.

In this configuration, the first transfer section and the second transfer section where transfer work for transfer to the transport vehicles on the transfer passage is performed are disposed on both sides in the X direction with respect to the transfer passage. Therefore, with this configuration, the supply amount of the articles supplied to the transport vehicles can be at least doubled in the entire transfer area. The transfer passage includes: a first stop position for the transport vehicles to be supplied with the articles by the transfer work in the first transfer section to stop; and a second stop position for the transport vehicles to be supplied with the articles by the transfer work in the second transfer section to stop, the first stop position and the second stop position being set at different positions on the transfer passage. Therefore, it is possible to prevent interference between a transport vehicle to be supplied with articles from the first transfer section and another transport vehicle to be supplied with articles from the second transfer section on the transfer passage. As described above, with this configuration, it is possible to prevent interference between transport vehicles and increase the efficiency of supplying articles to the transport vehicles throughout the facility.

It is preferable that, with a first floor being the floor, the article sorting facility further includes a second floor disposed at a different position in a vertical direction from the first floor, with a first side in the Y direction being one side in the Y direction and a second side in the Y direction being another side in the Y direction, the transfer area is disposed on the first side in the Y direction relative to the connection area, the receiving area is disposed on the second side in the Y direction relative to the connection area, the transfer passage includes: a first transfer passage; and a second transfer passage disposed adjacent to the first transfer passage on the second side in the X direction, the article sorting facility further includes a lifter disposed on the first side in the Y direction relative to the first transfer passage and the second transfer passage and configured to raise and lower the transport vehicles between the first floor and the second floor, and the first transfer passage and the second transfer passage are each connected to the lifter via one common path.

With this configuration, a plurality of transfer passages (a first transfer passage and a second transfer passage) can be provided for one lifter. Therefore, the number of lifters, which tend to be relatively expensive, can be reduced, making it easier to reduce costs incurred in installing and maintaining the lifters.

It is preferable that the first transfer passage is continuous with the common path, the second transfer passage branches from the common path to the second side in the X direction, and the transport vehicles that have exited the lifter on the first floor preferentially travel along the second transfer passage.

With this configuration, the first transfer passage can be made relatively free of congestion, so that the transport vehicles can travel smoothly on the common path that is continuous with the first transfer passage on the upstream side of the first transfer passage. In addition, this common path is connected to both the first transfer passage and the second transfer passage. Therefore, with this configuration, the transport vehicles can travel smoothly on both the first transfer passage and the second transfer passage.

It is preferable that the transfer area is provided with containers each capable of storing the articles, the transport vehicles transport the articles or the containers storing the articles received in the transfer area to the receiving area, sorting work is performed in the receiving area to sort the articles, the sorting work includes removal work performed to remove the articles from the containers transported by the transport vehicles, the article sorting facility further includes an empty container collecting device configured to collect the containers emptied by the removal work, and the article sorting facility further includes collecting paths along which the empty containers are transported by the empty container collecting device and that extend to a position adjacent to the first transfer section and a position adjacent to the second transfer section, respectively.

With this configuration, after the articles stored in the containers are transported to the receiving area and sorted, the containers that are empty after the articles have been removed from them can be collected by the empty container collection device.

The collected empty containers can be transported to the first transfer section and the second transfer section along the collecting paths, and reused in the work performed in the first transfer section and the second transfer section.

It is preferable that the article sorting facility further includes a transit path disposed between the first transfer passage and the second transfer passage in the X direction to allow passage of the transport vehicles that are not to be supplied with the articles in the transfer area.

With this configuration, transport vehicles that do not need to be supplied with articles in the transfer area, such as transport vehicles that already have the articles to be transported, can pass through the transfer area without being affected by other transport vehicles that are stopped in the first transport passage or the second transfer passage in order to be supplied with articles.

INDUSTRIAL APPLICABILITY

The technology according to the present disclosure is applicable to an article sorting facility including a plurality of transport vehicles each travelling on a floor and transporting articles to sort the articles.

What is claimed is:

1. An article sorting facility comprising a plurality of transport vehicles each travelling on a floor and transporting articles to sort the articles, wherein:

the floor comprises:

a transfer area where transfer work is performed to transfer the articles to the transport vehicles;

a receiving area where the articles transported by the transport vehicles are received; and a connection area connecting the transfer area and the receiving area, a Y direction is a specific direction among directions extending along the floor, an X direction is a direction orthogonal to the Y direction among the directions extending along the floor, a first side in the X direction is one side in the X direction, and a second side in the X direction is another side in the X direction, the transfer area comprises:

at least one transfer passage extending in the Y direction;

a first transfer section disposed on the first side in the X direction relative to the transfer passage and where the transfer work for transfer to the transport vehicles on the transfer passage is performed; and a second transfer section disposed on the second side in the X direction relative to the transfer passage and where the transfer work for transfer to the transport vehicles on the transfer passage is performed, the transfer passage comprises:

a first stop position for the transport vehicles to be supplied with the articles by the transfer work in the first transfer section to stop; and a second stop position for the transport vehicles to be supplied with the articles by the transfer work in the second transfer section to stop, the first stop position and the second stop position set at different positions on the transfer passage, the transfer passage includes a plurality of travel lanes, and the plurality of travel lanes are arranged in the X direction and are continuous with each other.

2. The article sorting facility according to claim 1, wherein:

a first floor is the floor, the article sorting facility further comprises a second floor disposed at a different position in a vertical direction from the first floor, a first side in the Y direction is one side in the Y direction and a second side in the Y direction is another side in the Y direction, the transfer area is disposed on the first side in the Y direction relative to the connection area, the receiving area is disposed on the second side in the Y direction relative to the connection area, the transfer passage comprises:

a first transfer passage; and a second transfer passage disposed adjacent to the first transfer passage on the second side in the X direction, the article sorting facility further comprises a lifter disposed on the first side in the Y direction relative to the first transfer passage and the second transfer passage and configured to raise and lower the transport vehicles between the first floor and the second floor, and the first transfer passage and the second transfer passage are each connected to the lifter via one common path.

3. The article sorting facility according to claim 2, wherein:

the first transfer passage is continuous with the common path, the second transfer passage branches from the common path to the second side in the X direction, if there are no other transport vehicles at either the first stop position or the second stop position, the transport vehicles that have exited the lifter on the first floor select the second stop position as their destination and move from the common path to the second transfer passage, and if there are other transport vehicles at both the first stop position and the second stop position, the transport vehicles that have exited the lifter on the first floor select the second stop position as their destination and move from the common path to the second transfer passage.

4. The article sorting facility according to claim 2, further comprising:

a transit path disposed between the first transfer passage and the second transfer passage in the X direction to allow passage of the transport vehicles that are not to be supplied with the articles in the transfer area.

5. The article sorting facility according to claim 1, wherein:

the transfer area is provided with containers each capable of storing the articles, the transport vehicles transport the articles or the containers storing the articles received in the transfer area to the receiving area, sorting work is performed in the receiving area to sort the articles, the sorting work comprises removal work performed to remove the articles from the containers transported by the transport vehicles, the article sorting facility further comprises an empty container collecting device configured to collect the containers emptied by the removal work, and the article sorting facility further comprises collecting paths along which the empty containers are transported by the empty container collecting device and that extend to a position adjacent to the first transfer section and a position adjacent to the second transfer section, respectively.

6. The article sorting facility according to claim 1, wherein:

the transfer passage includes a first transfer passage and a second transfer passage, the first transfer passage is the travel lane arranged closest to the first side in the X direction among the plurality of travel lanes, the second transfer passage is the travel lane arranged closest to the second side in the X direction among the plurality of travel lanes, the first stop position is arranged on the first transfer passage, and the second stop position is arranged on the second transfer passage.

* * * * *